United States Patent Office 3,394,057
Patented July 23, 1968

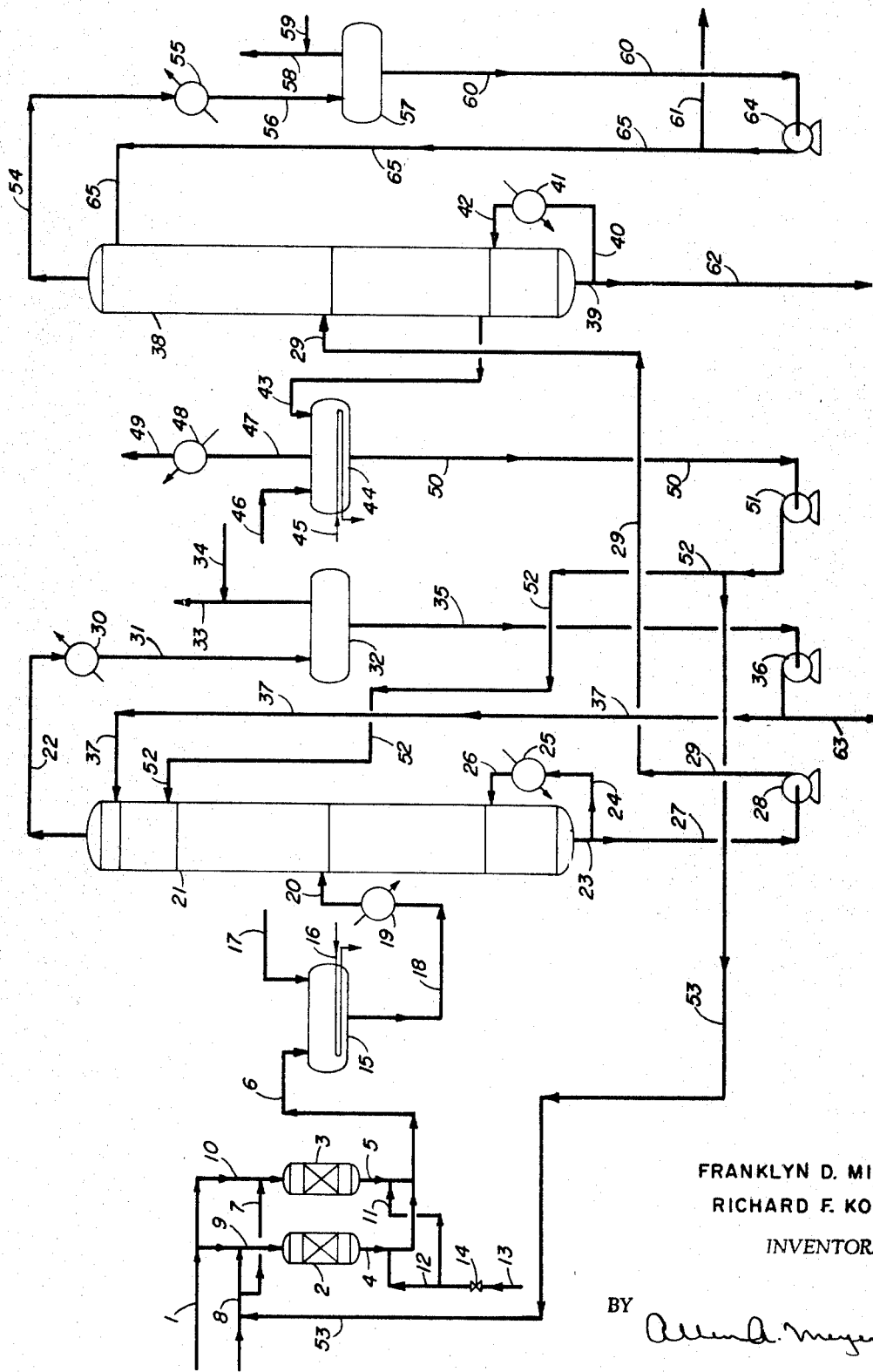

3,394,057
SEPARATION OF VINYL ACETATE FROM CYCLOHEXANE BY EXTRACTIVE DISTILLATION
Franklyn D. Miller, Cincinnati, and Richard F. Kohne, Reading, Ohio, assignors to National Distillers and Chemical Corporation, New York, N.Y., a corporation of Virginia
Filed Sept. 12, 1967, Ser. No. 667,299
8 Claims. (Cl. 203—52)

ABSTRACT OF THE DISCLOSURE

Process for separation of cyclohexane from mixtures containing vinyl acetate. At least one extractive distillation step is employed with a saturated $C_8$ to $C_{12}$ hydrocarbon as the extractive solvent.

---

This invention relates generally to separation processes for separation, purification and recovery of volatile solvents and more particularly to the recovery of cyclohexane from systems involving the polymerization and copolymerization of vinyl monomers such as vinyl acetate.

An object of the invention is to separate cyclohexane from systems in which it is present with materials with which it forms one or more azeotropes.

A further object is to provide an extractive distillation system by which cyclohexane can readily be separated using higher boiling hydrocarbons to suppress the volatility of the cyclohexane.

A still further object of this invention is to provide a separation and recovery system for the modifier employed in polymerization processes in which vinyl acetate is subjected to polymerization or copolymerization.

Another object is to separate cyclohexane from a mixed stream containing among other components, substantial amounts of vinyl acetate.

In industrial operations there are frequent occasions in which cyclohexane is used as solvent or diluent or otherwise such that it passes through the reaction and is present in the final reaction mixture admixed with other volatile materials such as vinyl acetate. One such type of process involves polymerization or copolymerization of vinyl acetate in which cyclohexane is used as the modifier. It is economically important to separate the solvent cyclohexane in relatively pure state from the unreacted vinyl acetate. Unfortunately, vinyl acetate forms a minimum boiling azeotrope with cyclohexane and these components cannot be separated by straight binary distillation.

It has now been discovered that the separating of the cyclohexane can be effected by extractive distillation technique using either essentially saturated straight or branched chain aliphatic hydrocarbons, either pure or mixed fractions, having 8 to 12 carbon atoms as the extractive distillation solvent. Further studies have shown that when a hydrocarbon is present, the relative volatility of the vinyl acetate-cyclohexane is greater than 1.5.

In carrying out this novel separation procedure, a number of $C_8$ through $C_{12}$ hydrocarbons and hydrocarbon fractions can be employed. The pure hydrocarbons, octanes, nonanes, decanes, isooctanes, and the like can be used including as useful either those with straight chain or the various branched chain carbon structures. Polymerized fractions of ethylene tetramers and propylene trimers and tetramers can also be employed. Various crude petroleum fractions comprised predominantly of the $C_8$ to $C_{12}$ hydrocarbons have also been found useful, as well as economical.

Generally, the separation of the vinyl acetate and cyclohexane is carried out using an extraction distillation technique which employs the $C_8$ to $C_{12}$ saturated hydrocarbon as the extractive solvent. At least one and preferably two columns are employs in the system, one column being employed for vinyl acetate recovery and the other for cyclohexane recovery. The hydrocarbon or mixture of hydrocarbons used as the extractive solvent can be recycled to the system as desired after suitable separation and treatment. The process is essentially carried out at atmospheric pressures. In accord with conventional extractive distillation practice, the appropriate saturated hydrocarbon solvent is introduced into the upper portion of an extractive distillation tower substantially above the inlet for the mixed feed to be separated. The more volatile vinyl acetate is removed as a substantially pure stream from the top of the tower above the extractive solvent inlet and a mixture of the solvent and cyclohexane is removed from a lower portion of the tower. This mixture is then taken to a second tower, where it is separated by distillation, and the cyclohexane recovered. A polymerization inhibitor is advantageously used in streams containing vinyl acetate to prevent polymerization.

The invention will be described in greater detail by the examples presented herein below.

Example 1

The effect of the presence of a higher hydrocarbon on the volatilities of the components was investigated, using the system vinyl acetate—cyclohexane-mineral spirits. The mineral spirits studied were a saturated hydrocarbon fraction having $C_{12}$ components.

In determining these volatilities, the liquid and vapor phases were analyzed for vinyl acetate and cyclohexane and the mineral spirits or hydrocarbon fraction concentration determined by difference. An average molecular weight of 170 was used for the hydrocarbon in converting values from weight to mole percent.

Four sets of data were obtained in which the ratio of vinyl acetate to cyclohexane was held constant in each set and the mineral spirits varied over the approximate range of 70 to 90 mole precent. The relative volatility or alpha values in this system range between 1.4 and 2.0.

The volatility data results are shown in Table I below:

TABLE I.—VINYL ACETATE (A)—CYCLOHEXANE (B)—MINERAL SPIRITS (C)

| B.P., °C. | Vapor, Mole Percent | | | Liquid, Mole Percent | | | K | | $K_A/K_B$ |
|---|---|---|---|---|---|---|---|---|---|
| | A | B | C | A | B | C | A | B | |
| 131.3 | 10.62 | 73.49 | 15.89 | 1.88 | 25.98 | 72.14 | 5.65 | 2.83 | 2.00 |
| 151.8 | 6.85 | 57.56 | 35.59 | 1.22 | 16.77 | 82.01 | 5.61 | 3.43 | 1.64 |
| 161.8 | 5.37 | 44.00 | 50.63 | 0.55 | 8.18 | 91.27 | 9.76 | 5.38 | 1.81 |
| 133.5 | 19.46 | 61.72 | 18.82 | 3.87 | 23.45 | 72.68 | 5.03 | 2.63 | 1.91 |
| 142.4 | 15.46 | 59.06 | 25.48 | 2.65 | 18.04 | 79.31 | 5.83 | 3.27 | 1.78 |
| 145.2 | 15.62 | 54.76 | 29.62 | 2.48 | 15.94 | 81.58 | 6.30 | 3.44 | 1.83 |
| 165.1 | 8.82 | 35.09 | 56.09 | 1.38 | 7.81 | 90.81 | 6.39 | 4.49 | 1.42 |
| 135.9 | 34.87 | 44.04 | 21.09 | 8.40 | 17.46 | 74.14 | 4.15 | 2.52 | 1.65 |
| 147.4 | 29.77 | 38.30 | 31.93 | 5.18 | 11.82 | 83.00 | 5.75 | 3.24 | 1.77 |
| 167.9 | 15.28 | 23.60 | 61.12 | 2.56 | 5.75 | 91.69 | 5.97 | 4.10 | 1.46 |
| 127.5 | 55.23 | 29.14 | 15.63 | 12.33 | 12.27 | 75.40 | 4.48 | 2.37 | 1.89 |
| 152.5 | 37.52 | 24.23 | 38.25 | 7.88 | 7.76 | 84.36 | 4.76 | 3.12 | 1.53 |
| 162.9 | 28.39 | 17.10 | 54.51 | 4.34 | 4.33 | 91.33 | 6.54 | 3.95 | 1.66 |

A possible disadvantage of this system is that the high boiling hydrocarbon may tend to produce polymerization of the vinyl acetate. Selected liquid samples were analyzed for polymer by evaporating the liquid and weighing the residue. The residue values are shown in Table II and are corrected for the percent solids in the mineral spirits. Although the high boiling fraction produced some polymer, the $C_{12}$ hydrocarbon fraction is useful.

TABLE II.—VINYL ACETATE—CYCLOHEXANE—MINERAL SPIRITS

| B.P., °C.: | Weight Percent | |
|---|---|---|
| | Vinyl Acetate | Residue |
| 142.4 | 1.50 | |
| 147.4 | 2.87 | 0.075 |
| 152.5 | 4.33 | 0.030 |
| 161.8 | 0.29 | |
| 162.9 | 2.30 | 0.148 |
| 165.1 | 0.73 | 0.084 |
| 167.9 | 1.35 | 0.092 |

Example 2

It is also possible to employ pure nonane as the ternary solvent. The alpha volatility of the system has been found to be 2.3. Equilibrium data were obtained on vinyl acetate-cyclohexane ternary mixtures containing nonane. All the data in Table III below were obtained at one atmosphere with the starting solution containing approximately a 1:1 weight ratio of vinyl acetate to cyclohexane.

TABLE III.—VINLY ACETATE (A)—CYCLOHEXANE (B)—NONANE (C)

| B.P., °C. | Vapor, Mole Percent | | | Liquid, Mole Percent | | | K | | |
|---|---|---|---|---|---|---|---|---|---|
| | A | B | C | A | B | C | A | B | C |
| 85.8 | 55.01 | 36.38 | 8.61 | 17.86 | 27.65 | 54.49 | 3.08 | 1.32 | 0.158 |
| 95.6 | 52.14 | 35.19 | 12.67 | 15.23 | 24.01 | 60.76 | 3.42 | 1.47 | 0.209 |

Example 3

As a further possible ternary component commercial isooctane (2,2,4-trimethylpentane) was studied.

The data results are shown below in Table IV. In each set of studies, the ratio of vinyl acetate to cyclohexane was held constant and the isooctane content varied over the range of 68–88 mole percent.

TABLE IV.—VINYL ACETATE (A)—CYCLOHEXANE (B)—ISOOCTANE (C)

| B.P., °C. | Vapor, Mole Percent | | | Liquid, Mole Percent | | | K | | $K_A/K_B$ |
|---|---|---|---|---|---|---|---|---|---|
| | A | B | C | A | B | C | A | B | |
| 90.1 | 7.36 | 37.41 | 55.23 | 1.89 | 29.15 | 68.96 | 3.89 | 1.28 | 3.04 |
| 92.2 | 5.59 | 29.49 | 64.92 | 1.38 | 21.59 | 77.03 | 4.05 | 1.37 | 2.96 |
| 94.6 | 2.76 | 18.69 | 78.55 | 0.70 | 11.19 | 88.11 | 3.94 | 1.67 | 2.36 |
| 95.1 | 2.50 | 17.74 | 79.76 | 0.70 | 12.52 | 86.78 | 3.57 | 1.42 | 2.51 |
| 89.6 | 12.56 | 32.06 | 55.38 | 4.17 | 25.07 | 70.76 | 3.01 | 1.28 | 2.35 |
| 92.1 | 9.58 | 25.21 | 65.21 | 3.11 | 19.52 | 77.37 | 3.08 | 1.29 | 2.39 |
| 94.4 | 4.83 | 15.39 | 79.78 | 1.30 | 11.10 | 87.60 | 3.72 | 1.38 | 2.70 |
| 85.9 | 27.70 | 22.77 | 49.52 | 9.34 | 19.85 | 70.81 | 2.97 | 1.15 | 2.58 |
| 89.9 | 18.51 | 18.08 | 63.41 | 6.45 | 14.73 | 78.82 | 2.87 | 1.23 | 2.33 |
| 93.3 | 11.76 | 11.68 | 76.56 | 3.21 | 8.67 | 88.12 | 3.66 | 1.35 | 2.71 |
| 83.6 | 38.41 | 14.70 | 46.89 | 14.99 | 13.70 | 71.31 | 2.56 | 1.07 | 2.39 |
| 87.9 | 28.62 | 11.71 | 59.67 | 10.62 | 10.09 | 79.29 | 2.69 | 1.16 | 2.32 |
| 88.1 | 30.17 | 8.84 | 60.99 | 9.61 | 6.98 | 83.41 | 4.08 | 1.27 | 3.21 |

Example 4

Equilibrium data were obtained using a saturated propylene trimer. The results are shown in Table V below.

TABLE V.—VINYL ACETATE (A)—CYCLOHEXANE (B)—PROPYLENE TRIMER (C)

| Temp. (°C.) | Vapor, Mole Percent | | | Liquid, Mole Percent | | | K | | $K_A/K_B$ |
|---|---|---|---|---|---|---|---|---|---|
| | A | B | C | A | B | C | A | B | |
| 104.4 | 11.09 | 61.20 | 27.71 | 2.04 | 30.42 | 67.54 | 5.44 | 2.01 | 2.71 |
| 107.7 | 18.74 | 50.85 | 30.41 | 3.81 | 25.51 | 70.68 | 4.92 | 1.99 | 2.47 |
| 101.4 | 40.87 | 34.03 | 25.10 | 9.94 | 19.96 | 70.10 | 4.11 | 1.70 | 2.42 |
| 102.3 | 49.82 | 23.44 | 26.74 | 13.71 | 13.95 | 72.34 | 3.63 | 1.68 | 2.16 |
| 97.1 | 71.72 | 5.42 | 22.86 | 21.64 | 3.47 | 74.89 | 3.31 | 1.56 | 2.12 |
| 94.3 | 70.69 | 10.15 | 19.15 | 22.07 | 6.86 | 71.07 | 3.20 | 1.48 | 2.16 |
| 95.9 | 75.77 | 1.01 | 23.22 | 23.92 | 0.69 | 75.39 | 3.17 | 1.46 | 2.17 |
| 93.3 | 78.89 | 2.61 | 18.50 | 27.00 | 1.85 | 71.15 | 2.92 | 1.41 | 2.07 |
| 96.3 | 13.07 | 71.20 | 15.71 | 3.34 | 47.51 | 49.16 | 3.91 | 1.50 | 2.61 |
| 91.7 | 41.55 | 44.14 | 14.31 | 12.32 | 32.74 | 54.94 | 3.37 | 1.35 | 2.50 |
| 86.6 | 66.11 | 21.88 | 12.01 | 26.66 | 17.90 | 55.44 | 2.48 | 1.22 | 2.03 |
| 79.6 | 68.71 | 24.50 | 6.79 | 36.61 | 22.61 | 40.78 | 1.88 | 1.08 | 1.74 |
| 80.9 | 76.67 | 14.86 | 8.47 | 40.67 | 12.91 | 46.42 | 1.89 | 1.15 | 1.64 |
| 81.5 | 88.64 | 1.99 | 9.37 | 49.83 | 1.64 | 48.53 | 1.78 | 1.21 | 1.47 |
| 80.2 | 85.36 | 7.03 | 7.61 | 51.19 | 5.93 | 42.88 | 1.67 | 1.19 | 1.40 |
| 115.3 | 12.31 | 44.86 | 42.83 | 2.29 | 19.26 | 78.45 | 5.38 | 2.33 | 2.31 |
| 118.3 | 12.82 | 35.89 | 51.28 | 2.48 | 14.88 | 82.64 | 5.17 | 2.41 | 2.15 |
| 107.8 | 34.62 | 32.55 | 32.83 | 7.12 | 16.41 | 76.47 | 4.86 | 1.98 | 2.45 |
| 112.6 | 38.18 | 19.24 | 42.51 | 7.75 | 8.71 | 83.54 | 4.93 | 2.21 | 2.23 |
| 111.5 | 53.46 | 4.39 | 42.15 | 10.58 | 1.95 | 87.46 | 5.05 | 2.25 | 2.24 |
| 105.8 | 58.09 | 8.81 | 33.10 | 12.79 | 4.64 | 82.57 | 4.54 | 1.90 | 2.39 |
| 103.3 | 67.32 | 2.37 | 30.31 | 15.81 | 1.28 | 82.91 | 4.26 | 1.85 | 2.30 |

Example 5

The process for carrying out the separation in an effective manner is shown schematically on the accompanying diagram in the sole figure.

A mixture of major proportions of unpolymerized vinyl acetate monomer and a minor amount of cyclohexane such as might be produced as by-product in a polymerization reactor producing polymer and copolymers is introduced into the system via line 1. This stream passes through lines 9 and/or 10 into driers 2 and 3. These driers are provided in the system to insure against the introduction of moisture into the other parts of the equipment, since moisture would create corrosion problems. Any efficient desiccant such as activated alumina can be used in the driers. The driers 2 and 3 are also provided with inlet pipes 13, 4, 5 and 11, with a superheated steam source, and valving arrangement 14 to permit regeneration of the desiccant bed on a twenty-four hour cycle using superheated steam. The dried gas feed stream is passed from driers 2 and 3 via outlet pipes 4 and 5 respectively into line 6 and thence into a surge drum 15. As desired, fuel gas may be introduced into drum 15 via line 17. The feed mixture is preheated to about 100° F. with steam carried via line 18 through preheater 19 and line 20 into vinyl acetate recovery tower 21 at approximately the midpoint of the tower. This tower preferably has 50 to 60 plates and a stream of relatively pure vinyl acetate is removed from the upper portion thereof by line 22. Saturated propylene trimer, a $C_9$ stream used as the extractive solvent to alter the relative volatilities of vinyl acetate and cyclohexane in the feed mixture, is passed from a solvent surge drum 44 via lines 50 and 52 and pump 51 into a solvent feed tray in the upper portion, but below outlet line 22 of tower 21. Heat is provided to tower 21 by a steam heated reboiler 25 into which liquid is pumped by lines 23 and 24 and thence back to the lower portion of said tower 21 by line 26. Overhead vapors, enriched in vinyl acetate, are removed by line 22 and passed to condenser 30. The liquid from condenser 30 passes by line 31 into collector 32. A portion is returned to tower 21 as reflux by lines 35 and 37 and pump 36 and the remainder is removed from line 37 by outlet line 63 and taken to vinyl acetate storage. From the bottom of tower 21, outlet lines 23 and 27 carry a stream, principally containing cyclohexane and saturated polypropylene trimer solvent, via pump 28 and line 29 into the midportion of cyclohexane recovery tower 38.

The heat to tower 38 is provided by reboiler 41, with inlet lines 39 and 40 and outlet line 42. Liquid is removed from the bottom of tower 38 via line 39 and passed through lines 40 and 42 through reboiler 41. A portion may be removed from bottom outlet line 39 by line 62 as desired. This line 62 removes principally heavy ends and small amounts of solvent. Overhead vapors from the top of tower 38 are removed by outlet line 54 through condenser 55. The liquid from condenser 55 passes by line 56 into reflux drum 57 which has a fuel gas inlet 59 and vent line 58. A portion of this liquid is passed by lines 60 and 65 through pump 64 as reflux into the upper portion of tower 38. The remainder is removed to cyclohexane storage through line 61. From the lower portion of tower 38 line 43 removes a stream consisting principally of recovered trimer solvent to solvent surge drum 44. Make up solvent as needed is added to drum 44 by line 46. The heat in drum 44 is controlled to about 250° F. by steam piping 45. Solvent surge drum is equipped with outlet pipe 47 and condenser 48, having vent outlet 49. The liquid from surge drum 44 is removed as required by line 50 and pumped by pump 51 either through line 52 to the upper portion of column 21 or by lines 53, 7 and 8 through inlet lines 9 and 10 into driers 2 and 3 and thence back into the recovery system. Employing the above described system it is possible to obtain recovered vinyl acetate having a maximum of 1 mole percent of cyclohexane and cyclohexane having a maximum of 1,000 p.p.m. of vinyl acetate.

The invention has been described hereinabove in a preferred embodiment, but it is to be understood that the invention is in no way confined to the particular forms, uses or sizes shown and described, the same being merely illustrative, and that the invention may be made and carried out in other ways without departure from the spirit of the invention, and therefore there is claimed the right to employ all equivalents coming within the scope of the appended claims and by means of which the objects of the invention are obtained and new results and advantages accomplished.

What is claimed is:

1. A process for the separation of vinyl acetate and cyclohexane from mixed streams containing them which comprises subjecting said mixed streams to at least one extractive distillation using a saturated $C_8$ to $C_{12}$ hydrocarbon stream as the extractive solvent.

2. The process of claim 1 in which an octane is the extractive solvent.

3. The process of claim 1 in which a nonane is the extrative solvent.

4. The process of claim 1 in which a decane is the extractive solvent.

5. The process of claim 1 in which isooctane is the extractive solvent.

6. The process of claim 1 in which propylene trimer is the extractive solvent.

7. In a process for separating a mixture of vinyl acetate and cyclohexane by distillation, the improvement which comprises the steps of introducing the said mixture into the midportion of a distillation column, introducing a stream of a $C_8$ to $C_{12}$ saturated hydrocarbon into said column into the upper portion of said column, removing a vinyl acetate stream from the top of said column, removing a mixture of cyclohexane and $C_8$ to $C_{12}$ saturated hydrocarbon from the lower portion of said column, and subsequently separating said latter mixture by distillation to recover cyclohexane and $C_8$ to $C_{12}$ saturated hydrocarbon.

8. The process of claim 7 in which at least a part of the $C_8$ to $C_{12}$ saturated hydrocarbon is recycled to the first distillation column.

References Cited
UNITED STATES PATENTS

| | | | |
|---|---|---|---|
| 2,719,143 | 9/1955 | Van Dijk et al. | 260—89.1 |
| 3,053,820 | 9/1962 | Wechsler et al. | 260—89.1 |
| 3,131,228 | 4/1964 | Moon | 260—666 |
| 3,255,135 | 6/1966 | Schmidle et al. | 260—89.1 |

WILBUR L. BASCOMB, JR., *Primary Examiner.*